(12) United States Patent
Cha et al.

(10) Patent No.: US 10,955,627 B2
(45) Date of Patent: Mar. 23, 2021

(54) PLANAR OPTICAL WAVEGUIDE AND OPTICAL MODULE

(71) Applicant: FIBERPRO, INC., Daejeon (KR)

(72) Inventors: Sang Jun Cha, Gwangju (KR); Sung Duck Kim, Gwangju (KR); Eun Il Jeong, Gwangju (KR)

(73) Assignee: FIBERPRO, INC., Daejeon (KR)

( * ) Notice: Subject to any disclaimer, the term of this patent is extended or adjusted under 35 U.S.C. 154(b) by 0 days.

(21) Appl. No.: 16/603,099

(22) PCT Filed: Apr. 9, 2018

(86) PCT No.: PCT/KR2018/004157
§ 371 (c)(1),
(2) Date: Oct. 4, 2019

(87) PCT Pub. No.: WO2018/186723
PCT Pub. Date: Oct. 11, 2018

(65) Prior Publication Data
US 2020/0110230 A1    Apr. 9, 2020

(30) Foreign Application Priority Data
Apr. 7, 2017 (KR) .................. 10-2017-0045051

(51) Int. Cl.
*G02B 6/42* (2006.01)

(52) U.S. Cl.
CPC ............. *G02B 6/4202* (2013.01); *G02B 6/42* (2013.01)

(58) Field of Classification Search
CPC ................................ G02B 6/4202; G02B 6/42
(Continued)

(56) References Cited

U.S. PATENT DOCUMENTS 7,653,278 B2 * 1/2010 Hamada ................ G02B 6/138
                                                      385/129
7,941,017 B2    5/2011 Juni
(Continued)

FOREIGN PATENT DOCUMENTS

CN          1484348         3/2004
CN        101620488 A       1/2010
(Continued)

OTHER PUBLICATIONS

PCT/KR2018./004157, "PCT ISR/WO," dated Jun. 25, 2018.
(Continued)

*Primary Examiner* — Jerry M Blevins
(74) *Attorney, Agent, or Firm* — Kilpatrick Townsend & Stockton LLP (57) ABSTRACT

The present disclosure relates to a planar optical waveguide and an optical module. A planar optical waveguide according to the present disclosure includes a core and dads provided at an upper portion and a lower portion of the core, respectively, and an end of an upper clad facing a light source is polished to form a first refractive surface inclined at a first angle to refract a light emitted to the upper portion of the core and guide the light to the core.

The refractive surfaces are formed at the upper clad and the lower clad of the planar optical waveguide in consideration of beam characteristics of the light source to reduce optical coupling loss without a separate optical waveguide lens.

10 Claims, 7 Drawing Sheets

(58) Field of Classification Search
USPC .......................................................... 385/129
See application file for complete search history.

(56) References Cited

U.S. PATENT DOCUMENTS

| | | | |
|---|---|---|---|
| 8,369,675 | B2 | 2/2013 | Yanagisawa |
| 2001/0043387 | A1* | 11/2001 | Lawrence ............... H01S 3/063 359/333 |
| 2003/0081902 | A1* | 5/2003 | Blauvelt ................. G02B 6/125 385/50 |
| 2005/0069257 | A1 | 3/2005 | Bhagavatula et al. |
| 2006/0029345 | A1 | 2/2006 | Fushimi |
| 2008/0131583 | A1 | 6/2008 | Nakel et al. |
| 2010/0074579 | A1* | 3/2010 | Fujii .................... G02B 6/4214 385/31 |
| 2010/0135619 | A1 | 6/2010 | Choi et al. |
| 2012/0287674 | A1* | 11/2012 | Nichol ................. G02B 6/0028 362/611 |
| 2015/0104128 | A1 | 4/2015 | Oka et al. |
| 2015/0316721 | A1* | 11/2015 | Grossman ............... G02B 6/26 385/27 |

FOREIGN PATENT DOCUMENTS

| | | |
|---|---|---|
| CN | 101629700 | 1/2010 |
| CN | 102255235 | 11/2011 |
| CN | 102401936 | 4/2012 |
| CN | 106526761 | 4/2012 |
| JP | 3079401 | 8/2000 |
| JP | 2001051127 | 2/2001 |
| JP | 2003014957 | 1/2003 |
| JP | 2003513328 | 4/2003 |
| JP | 2003515253 | 4/2003 |
| JP | 2004133446 | 4/2004 |
| JP | 2004157530 | 6/2004 |
| JP | 2005070573 | 3/2005 |
| JP | 2011133913 | 7/2011 |
| KR | 20080066169 | 7/2008 |
| KR | 20100039394 | 4/2010 |
| KR | 20100128085 | 12/2010 |
| KR | 101083341 | 11/2011 |
| KR | 20120035912 | 4/2012 |
| KR | 20140011521 | 1/2014 |

OTHER PUBLICATIONS

CN201880022931.8, "Office Action", dated Apr. 2, 2020, 9 pages.
CN201880022931.8, Second Office Action, dated Dec. 18, 2020, 9 pgs.

* cited by examiner

PLANAR OPTICAL WAVEGUIDE AND OPTICAL MODULE

CROSS-REFERENCES TO RELATED APPLICATIONS

The present application is a U.S. National Stage of International PCT/KR2018/004157, filed Apr. 9, 2018, which application claims priority to Korean Patent Application No. 10-2017-0045051, filed Apr. 7, 2017, the entire contents of which are hereby incorporated by reference in their entirety for all purposes.

TECHNICAL FIELD

The present disclosure relates to a planar optical waveguide including a lens function to focus a waveguide light and an optical module.

BACKGROUND

When a light is emitted from a conventional light source, such as a laser diode (LD) or photodiode (PD), the light has an elliptical beam shape, which is elongated in a perpendicular direction, i.e., a vertical direction due to its structural characteristics.

Thus, a conventional planar optical waveguide separately requires an optical waveguide lens for focusing a waveguide light emitted from the light source to reduce optical coupling loss.

In an example, KR10-2014-0011521A, entitled External Cavity Laser Using Thin Film Filter and Optical Transmitter Comprising External Cavity Laser, published Jan. 29, 2014, the entire content of which is hereby incorporated herein by reference, discloses the optical coupling between the light source and an optical fiber using at least one lens.

BRIEF SUMMARY

Technical Problem

An aspect of the present disclosure provides a planar optical waveguide capable of reducing optical coupling loss without providing a separate optical waveguide lens, and an optical module.

Technical Solution

According to an aspect of the present disclosure, a planar optical waveguide includes a core and dads provided at an upper portion and a lower portion of the core, respectively, and an end of an upper clad facing a light source is polished to form a first refractive surface inclined at a first angle to refract a light emitted to the upper portion of the core and guide the light to the core.

In addition, an end of a lower clad facing the light source is processed to form a trench having a second refractive surface inclined at a second angle to refract a light emitted to the lower portion of the core and guide the light to the core.

Here, the first angle and the second angle are set depending to a refractive index of a clad material and radiation characteristics of the light source.

Furthermore, the end of the lower clad facing the light source may further include an adhesive surface, which is bonded to a side surface of a substrate on which the light source is mounted, to allow the light source to maintain a certain distance from the core of the optical waveguide. Here, the adhesive surface of the lower clad may be formed to allow an emission surface of the light source to be spaced apart from the core at a certain distance.

In an example, the first refractive surface and the second refractive surface may be applied with a polymer material and a silicone adhesive having a higher refractive index than a clad material to minimize rough surfaces formed on the refractive surfaces by being polished or processed.

According to another aspect of the present disclosure, a method of manufacturing a planar optical waveguide includes forming a lower clad layer as a plate type substrate, forming a core layer on the lower clad layer, forming an upper clad layer on the core layer, and forming a first refractive surface inclined at a first angle at an end of the upper clad layer facing a light source to refract a light emitted to an upper portion of the core layer and guide the light to the core layer.

In addition, the method of manufacturing a planar optical waveguide further includes forming a trench having a second refractive surface inclined at a second angle at an end of the lower clad layer facing the light source to refract a light emitted to a lower portion of the core layer and guide the light to the core layer.

Furthermore, the method of manufacturing a planar optical waveguide may further include forming an adhesive surface bonded to a side surface of a substrate on which the light source is mounted at a lower portion of the trench of the end of the lower clad layer facing the light source to allow the light source to maintain a certain distance from the core layer of the optical waveguide.

In an example, in the forming of the adhesive surface, the adhesive surface may be polished to have a polishing depth set with respect to the core layer.

Meanwhile, according to another aspect of the present disclosure, an optical module includes a light source, a substrate on which the light source is mounted, and a planar optical waveguide, and in the planar optical waveguide, an end of an upper clad facing the light source is polished to form a first refractive surface inclined at a first angle to refract a light emitted to an upper portion of a core and guide the light to the core.

In addition, in the planar optical waveguide, an end of a lower clad facing the light source is processed to form a trench having a second refractive surface inclined a second angle to refract a light emitted to a lower portion of the core and guide the light to the core.

The end of the lower clad facing the light source is bonded to a side surface of a substrate on which the light source is mounted to allow the light source to maintain a certain distance from the core.

Advantageous Effects

According to the present disclosure, a refractive surface in each of an upper clad and a lower clad of a planar optical waveguide is formed in consideration of the beam characteristics of the light source, thereby reducing the optical coupling loss without having a separate optical waveguide lens.

Other effects of the present disclosure will be described further according to the following examples.

DETAILED DESCRIPTION

The present disclosure may be variously modified and have various embodiments, and specific embodiments will be illustrated in the drawings and described in detail in the written description. However, this is not intended to limit the present disclosure to specific embodiments, and it should be understood to include all transformations, equivalents, and substitutes included in the spirit and scope of the present disclosure. In describing the present disclosure, when it is determined that the detailed description of the related known technology obscures the gist of the present disclosure, the detailed description thereof will be omitted.

The terminology used herein is for the purpose of describing particular example embodiments only and is not intended to limit the present disclosure. Singular expressions include plural expressions unless the context clearly indicates otherwise. In this application, the terms "comprise" or "have" are intended to indicate that there is a feature, number, step, operation, component, part, or combination thereof described in the specification. It is to be understood that the present disclosure does not exclude the possibility of the presence or the addition of numbers, steps, operations, components, parts, or a combination thereof.

Hereinafter, embodiments according to the present disclosure will be described in detail with reference to the accompanying drawings. In the following description with reference to the accompanying drawings, the same or corresponding components will be given the same reference numerals and duplicate description thereof will be omitted.

Figure 1A:
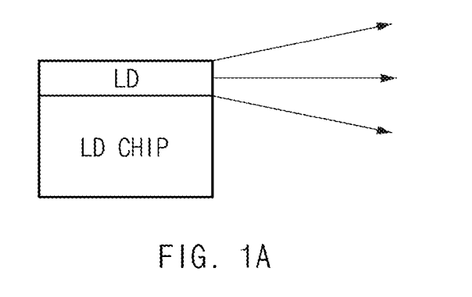
FIG. 1 is a conceptual diagram for explaining beam characteristics of a laser diode.

First, beam characteristics of a light source will be described with reference to FIG. 1. FIG. 1 is a conceptual diagram for explaining beam characteristics of a laser diode. FIG. 1A is a conceptual diagram illustrating beam emission of a laser diode from a side and FIG. 1B is a conceptual diagram illustrating a beam shape of beam emission of a laser diode viewed from a front.

Figure 1B:
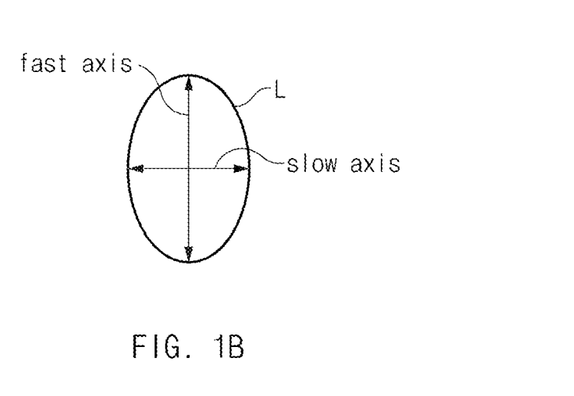

As illustrated in FIG. 1, when a laser diode on an LD chip is operated as a light source, a portion of a laser field is transmitted through one side of an active layer to emit a laser beam "L". Since a cross section of the active layer of the laser diode is rectangular and a portion of the laser field leaks out of the active layer due to limited confinement, the beam "L" at an emitting surface of the laser diode is formed by the active layer and has an elliptical shape as illustrated in FIG. 1B. Divergence of a beam of a single mode laser diode may vary depending on a type of laser diode, and a divergence angle may also vary in the same type. In general, the divergence angle of the laser diode is about 15 degrees to 40 degrees in a fast axis, and is about 6 degrees to 12 degrees in a slow axis. When the beam is emitted from the laser diode, the beam has an elliptical shape which is elongated in a perpendicular direction, i.e., a vertical direction because divergence size of the beam is large in a direction of the fast axis. Meanwhile, in FIG. 1, the laser diode is used as the light source, but a photodiode may be used as the light source.

Therefore, when optical coupling is generated between the light source and an optical waveguide at a specific interval, the optical coupling should be performed efficiently with respect to the light, which is emitted to an upper portion and a lower portion of a core of the optical waveguide due to the beam characteristics of the light source.

To this end, there is a method for focusing light (or beam) from the light source to the optical waveguide using an optical waveguide lens (hereinafter, also referred to simply as a 'lens').

For example, the light from the light source is focused using a single lens, a double lens, a cylindrical lens, or a GRIN lens, and a collected light is coupled to the optical waveguide.

Meanwhile, when the optical waveguide lens is used, an optical link between the light source and the optical waveguide is enabled, but there is a structural difficulty in connecting elements to maintain a constant distance between the light source and the optical waveguide.

Accordingly, the present disclosure provides a method for optically coupling between the light source and the planar optical waveguide, in which an end surface of the optical waveguide facing the light source is processed and the processed surface is used as a lens, thereby reducing the optical coupling loss without a separate lens.

Figure 2:
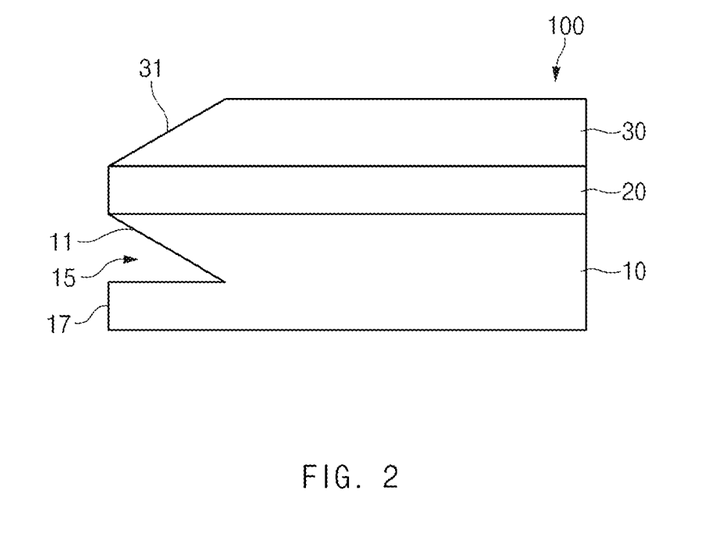
FIG. 2 is a side view illustrating a structure of a planar optical waveguide according to an embodiment of the present disclosure.
Figure 3:
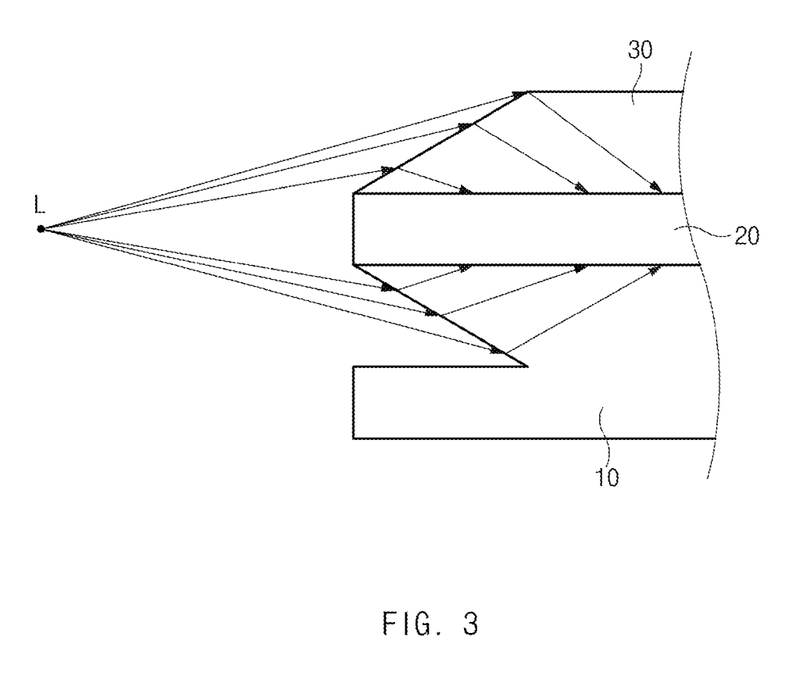
FIG. 3 is a view illustrating an optical coupling phenomenon of the planar optical waveguide of FIG. 2.

In sequence, a structure of the optical waveguide according to the present disclosure will be described with reference to FIGS. 2 and 3. FIG. 2 is a side view illustrating a structure of a planar optical waveguide according to an embodiment of the present disclosure and FIG. 3 is a view illustrating an optical coupling phenomenon of the planar optical waveguide of FIG. 2.

As illustrated in FIG. 2, a planar optical waveguide 100 according to the present disclosure may be largely divided into a core 20 and clads 10 and 30 and a light may pass through the core 20. Specifically, first, the planar optical waveguide 100 is a planar type (or a plate type) substrate and is formed by forming the core 20 on the lower clad 10, through which the light is guided, and forming the upper clad 30 on the core 20.

Here, an end of the upper clad 30 facing the light source is polished to form a first refractive surface 31 inclined at a first angel to refract a light emitted to an upper portion of the core 20 and guide a refracted light to the core 20.

The first refractive surface 31 may be polished using, for example, a polishing and grinding equipment to be formed while having the first angle with respect to a layer of the core 20.

Here, the first angle may be set within an angle range of 10 degrees or more and less than 90 degrees, and may be set depending on a refractive index of a clad material and radiation characteristics of the light source. Here, a core material and the clad material may be a polymer, silica, metal oxide or the like. Therefore, the first angle of the first refractive surface 31 during polishing and grinding may be adjusted based on the refractive index of the clad material to be used and the radiation characteristics of the light source (e.g., divergence angle in the vertical direction from the light source). For example, the clad material may have a refractive index of about 1.45 to 2.0.

Accordingly, as illustrated in FIG. 3, the light "L" emitted from the light source and radiated to the upper portion of the core 20 may be refracted by the first refractive surface 31 to guide to the layer of the core 20. That is, the first refractive surface 31 acts as an optical waveguide lens.

Similarly, an end of the lower clad 10 facing the light source is processed to form a trench 15 having a second refractive surface 11 inclined at a second angle to refract the light emitted to a lower portion of the core 20 and guide the refracted light to the core 20.

The trench 15 having the second refractive surface 11 may be processed using, for example, a dicing blade to be formed while having the second angle with respect to the layer of the core 20.

Here, the second angle may be set within an angle range of 10 degrees or more and less than 90 degrees, and may be set depending on the refractive index of the clad material and the radiation characteristics of the light source. For example, the first angle of the first refractive surface 31 and the second angle of the second refractive surface 11 may be set to be equal to each other and therefore, may be symmetrical with respect to the layer of the core 20, or may be set to be different from each other.

Accordingly, as illustrated in FIG. 3, the light "L" emitted from the light source and radiated to the lower portion of the core 20 may be refracted by the second refractive surface 11 to guide the refracted light to the layer of the core 20. In other words, the second refractive surface 11 also acts as an optical waveguide lens.

Therefore, the refractive surface 11 and 31 in each of the upper clad 30 and the lower clad 10 of the planar optical waveguide 100 is formed in consideration of the beam characteristics of the light source, thereby reducing the optical coupling loss without having a separate optical waveguide lens.

Figure 4A:
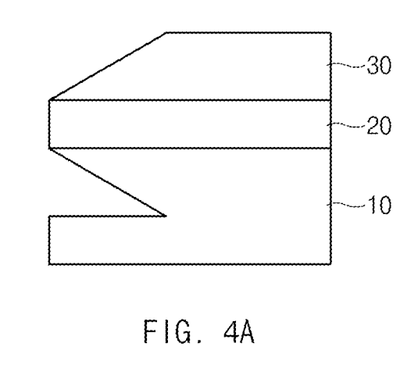
FIG. 4 is an exemplary view for illustrating various inclination angles of the first refractive surface and the second refractive surface of FIG. 2.
Figure 4B:
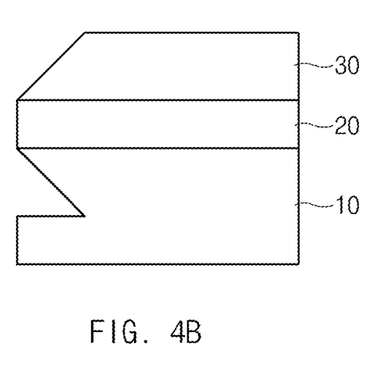
Figure 4C:
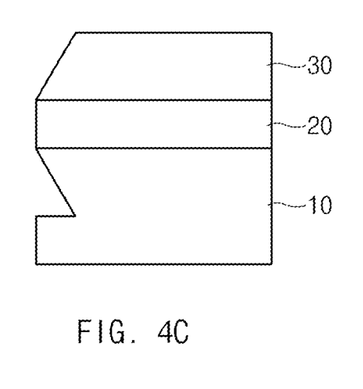

In sequence, FIG. 4 is an exemplary view for illustrating various inclination angles of the first refractive surface and the second refractive surface of FIG. 2. As illustrated in FIG. 4A, the first angle of the first refractive surface 31 and the second angle of the second refractive surface 11 may be formed to be inclined at about 30 degrees with respect to the layer of the core 20. Alternatively, as illustrated in FIG. 4B, the first angle of the first refractive surface 31 and the second angle of the second refractive surface 11 may be formed to be inclined at about 45 degrees with respect to the layer of the core 20. Alternatively, as illustrated in FIG. 4C, the first angle of the first refractive surface 31 and the second angle of the second refractive surface 11 may be formed to be inclined at about 60 degrees with respect to the layer of the core 20.

Subsequently, the end of the lower clad 10 facing the light source may further include an adhesive surface 17 which is bonded to a side of a substrate (e.g., a sub mount substrate 110 of FIG. 7) on which the light source is mounted to allow the light source to be spaced apart from the core of the optical waveguide 100 at a specific distance. To this end, the lower clad 10 is formed to have a larger thickness than the upper clad 30. For example, the adhesive surface 17 of the lower clad 10 may be formed to allow an emission surface of the light source to be spaced apart from the core 20 at a certain distance.

The adhesive surface 17 of the lower clad 10 may be formed an a lower portion of the trench 15, and, for example, may be polished to 90 degrees with respect to the layer of the core 20 using the polishing equipment after the trench 15 processing. Here, the trench 15 may be polished as a polishing depth of the adhesive surface 17 with respect to the core 20 is adjusted to set a distance between the light source and the optical waveguide. Alternatively, for setting the distance between the light source and the optical waveguide, an end surface of the core 20 facing the light source is polished with respect to the adhesive surface 17 to relatively adjust the polishing depth of the adhesive surface 17. In addition, upon manufacturing the planar optical waveguide, when the end surface of the planar optical waveguide facing the light source is formed in advance to have 90 degrees with respect to the layer of the core 20, the polishing process for forming the adhesive surface 17 may be omitted.

Accordingly, the adhesive surface 17 of the optical waveguide 100 is used to be bonded to and fixed to the substrate on which the light source is mounted. Therefore, the distance between the light source and the optical waveguide may be structurally set and the set distance may be kept constant as compared with using the conventional separate optical waveguide lens.

Subsequently, the trench 15 having the second refractive surface 11 in the lower clad 10 of the optical waveguide 100 may be processed to have various depths.

Figure 5A:
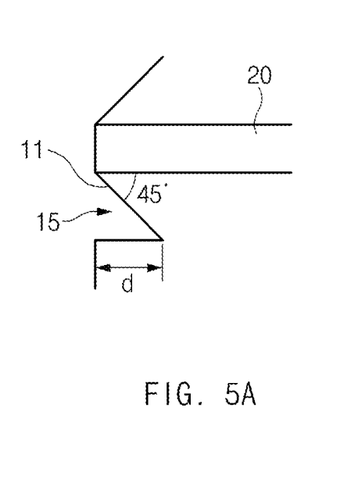
FIG. 5 is an exemplary view for illustrating various depths of the trench of FIG. 2.
Figure 5B:
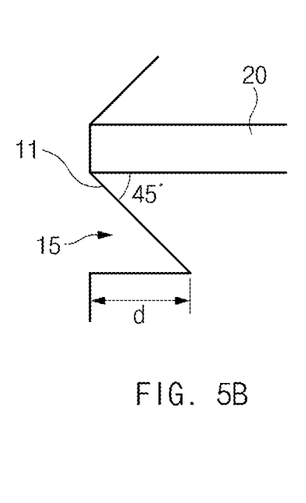
Figure 5C:
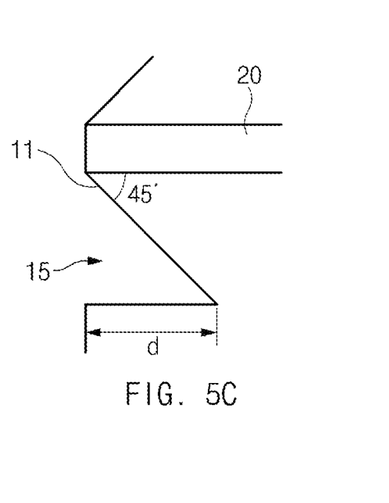

FIG. 5 is an exemplary view for illustrating various depths of the trench of FIG. 2. As illustrated in FIGS. 5A, 5B, and 5C, when the second angle of the second refractive surface 11 is about 45 degrees with respect to the layer of the core 20, the trenches 15 may be processed to have different depths. That is, the trenches 15 of the present disclosure may be processed to have different depths while maintaining the second angle of the second refractive surface 11. Thus, the polishing depth of the adhesive surface 17 may be adjusted easily.

Subsequently, a polymer material or a silicone adhesive, which has a higher refractive index than the clad material may be applied on the first refractive surface 31 of the upper clad 30 and the second refractive surface 11 of the lower clad 10, which are formed by polishing process using the polishing equipment or processing using a dicing blade, thereby minimizing the rough surfaces on the refractive surfaces. For example, the polymer material or silicone adhesive to be applied uses a material having a refractive index of approximately 0.1 to 1.0% higher than that of the clad material, and preferably has a refractive index approximately the same as that of the core.

Accordingly, refractive indexes of the rough surfaces formed on the first refractive surface 31 and the second refractive surface 11 are matched to each other to reduce a loss due to reflection or scattering at the rough surfaces of the first refractive surface 31 and the second refractive surface 11, through which the light passes, thereby minimizing the optical coupling loss.

Figure 6:
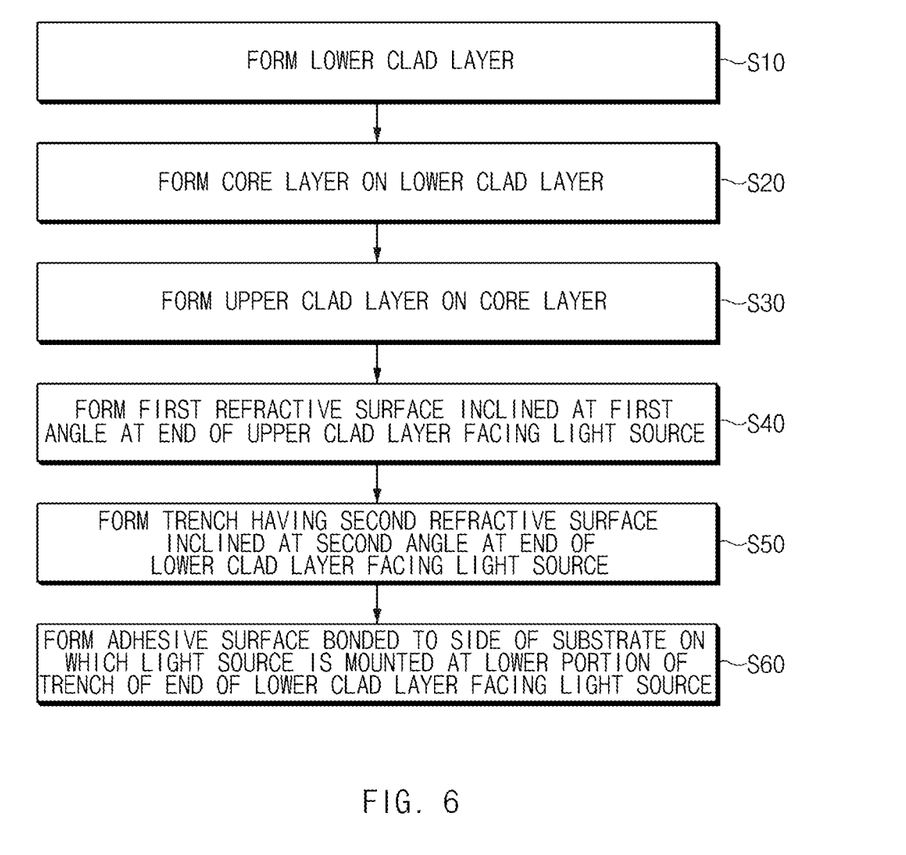
FIG. 6 is a flowchart illustrating a method of manufacturing a planar optical waveguide according to an embodiment of the present disclosure.

Subsequently, a method of manufacturing a planar optical waveguide according to the present disclosure will be described with reference to FIG. 6. FIG. 6 is a flowchart illustrating a method of manufacturing a planar optical waveguide according to an embodiment of the present disclosure.

As illustrated in FIG. 6, a method of manufacturing a planar optical waveguide according to the present disclosure includes forming a lower clad layer i.e., a flat substrate in S10, forming a core layer on the lower clad layer in S20, and forming an upper clad layer on the core layer in S30 to form the planar optical waveguide.

Subsequently, the first refractive surface inclined at the first angle is formed at the end surface of the upper clad layer facing the light source using, for example, the polishing and grinding equipment, thereby refracting the light emitted to the upper portion of a core layer and guiding the refracted light to the core layer in S40. Additionally, the trench having the second refractive surface inclined at the second angle is formed at the end surface of the lower clad layer facing the light source using, for example, the dicing blade, thereby refracting light emitted to the lower portion of the core layer and guiding the refracted light to the core layer in S50.

Here, forming the first refractive surface and forming the second refractive surface are not limited in order.

In one example, the first angle and the second angle may be set within an angle range of 10 degrees or more and less than 90 degrees, respectively, and may be set depending on the refractive index of the clad material and the radiation characteristics of the light source. Accordingly, the refractive surfaces are formed in the upper clad layer and the lower clad layer of the planar optical waveguide in consideration of the beam characteristics of the light source, thereby reducing the optical coupling loss without providing a separate optical waveguide lens.

Subsequently, the adhesive surface, which is bonded to the side surface of the substrate on which the light source is mounted, is formed at the lower portion of the trench of the end surface of the lower clad layer facing the light source to allow the light source to maintain a certain distance from the core layer of the optical waveguide in S60. In an example, in the forming of the adhesive surface in S60, the adhesive surface may be polished to have the polishing depth set with respect to the core layer. Accordingly, the polished adhesive surface of the optical waveguide may be bonded to and fixed to the substrate on which the light source is mounted, thereby structurally setting the specific distance between the light source and the optical waveguide and maintaining the specific distance, as compared with using the conventional separate optical waveguide lens.

In addition, the method of manufacturing the planar optical waveguide according to the present disclosure may including applying the polymer material or the silicone adhesive having the higher refractive index than the clad material on the first refractive surface and the second refractive surface to minimize the rough surfaces formed by polishing using the polishing equipment or processing using the dicing blade. Accordingly, the refractive indexes of the rough surfaces formed on the first refractive surface and the second refractive surface are matched to each other to reduce the loss due to reflection or scattering at the rough surfaces of the first refractive surface and the second refractive surface, through which the light passes, thereby minimizing the optical coupling loss.

Figure 7:
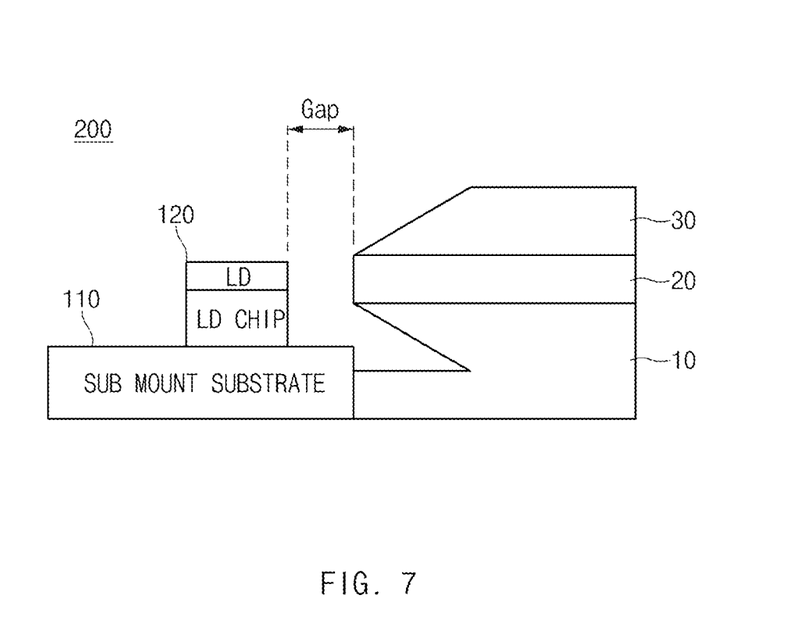
FIG. 7 is a side view illustrating a structure of an optical module according to an embodiment of the present disclosure.

Then, an optical module according to the present disclosure will be described with reference to FIG. 7. FIG. 7 is a side view illustrating a structure of an optical module according to an embodiment of the present disclosure.

As illustrated in FIG. 7, an optical module 200 according to the present disclosure may largely include the planar optical waveguide and the light source.

The light source may be, for example, a laser diode LD or a photodiode PD. For example, the light source may be formed of an LD chip 120 and the sub mount substrate 110 on which the LD chip is mounted. The LD chip 120 includes the laser diode LD.

Meanwhile, the planar optical waveguide includes the lower clad 10, the core 20 and the upper clad 30. Specifically, the planar optical waveguide 100 is formed by forming the core 20 through which light is guided on the lower clad 10 i.e., the plate type substrate and forming the upper clad 30 on the core 20.

In the planar optical waveguide, the end of the upper clad 30 facing the light source is polished to form the first refractive surface 31 inclined at the first angle to refract the light emitted to the upper portion of the core 20 and guide the refracted light to the core 20.

The first refractive surface 31 may be formed by being polished using, for example, the polishing and grinding equipment to have the first angle with respect to the layer of the core 20. Here, the first angle may be set within an angle range of 10 degrees or more and less than 90 degrees, and may be set depending on the refractive index of the clad material and the radiation characteristics of the light source. Accordingly, the light emitted from the light source and radiated to the upper portion of the core 20 may be refracted by the first refractive surface 31 to be guided to the layer of the core 20.

Similarly, the end of the lower clad 10 facing the light source is processed to form the trench having the second refractive surface inclined at the second angle to refract the light emitted to the lower portion of the core 20 and guide the refracted light to the core 20.

In addition, the end of the lower clad 10 facing the light source further includes the adhesive surface, which is bonded to the side surface of the substrate 110 on which the light source is mounted, to allow the light source to maintain the constant distance from the core of the optical waveguide 100. Thus, as illustrated in FIG. 7, the end of the lower clad 10 facing the light source is bonded to the side surface of the substrate 110 on which the light source is mounted to allow the light source to maintain a constant distance GaP from the core of the optical waveguide.

In one example, the adhesive surface of the lower clad 10 may be formed at the lower portion of the trench and, for example, may be polished to form 90 degrees with respect to the layer of the core 20 using the polishing equipment after the trench processing. Here, the trench may be polished as the polishing depth of the adhesive surface with respect to the core 20 is adjusted to set the distance between the light source and the optical waveguide. Accordingly, the adhesive surface of the optical waveguide is used to be bonded to and fixed to the substrate on which the light source is mounted, thereby setting the distance between the light source and the optical waveguide and easily fixing the set distance. Therefore, the optical coupling loss may be reduced.

As described above, according to the present disclosure, the refractive surfaces may be formed at the upper clad and the lower clad, respectively, in consideration of the beam characteristics of the light source to reduce the optical coupling loss without providing a separate optical waveguide lens.

The above description is merely illustrative of the technical spirit of the present disclosure and those skilled in the art will understand that various changes and modifications may be made hereto without departing from the essential characteristics of the present disclosure. Therefore, the embodiments disclosed in the present disclosure are not intended to limit the technical idea of the present disclosure but to describe the present disclosure, and the scope of the technical idea of the present disclosure is not limited by these embodiments. The protection scope of the present disclosure should be interpreted by the following claims, and all technical ideas within the equivalent scope should be interpreted as being included in the scope of the present disclosure.

What is claimed is:

1. A planar optical waveguide comprising a core and upper and lower clads provided at an upper portion and a lower portion of the core, respectively,
   wherein an end of the upper clad facing a light source is polished to form a first refractive surface inclined at a first angle to refract light emitted to the upper portion of the core and guide the light to the core, and
   wherein an end of the lower clad facing the light source is processed to form a trench having a second refractive surface inclined at a second angle to refract light emitted to the lower portion of the core and guide the light to the core.

2. The planar optical waveguide of claim 1, wherein the first angle and the second angle are set depending to a refractive index of a clad material and radiation characteristics of the light source.

3. The planar optical waveguide of claim 1, wherein the end of the lower clad facing the light source further includes an adhesive surface, which is bonded to a side surface of a substrate on which the light source is mounted, to allow the light source to maintain a certain distance from the core of the planar optical waveguide.

4. The planar optical waveguide of claim 3, wherein the adhesive surface of the lower clad is formed to allow an emission surface of the light source to be spaced apart from the core at a certain distance.

5. The planar optical waveguide of claim 1, wherein the first refractive surface and the second refractive surface are applied with a polymer material and a silicone adhesive having a higher refractive index than a clad material to minimize rough surfaces formed on the first and second refractive surfaces by being polished or processed.

6. An optical module comprising a light source, a substrate on which the light source is mounted, and a planar optical waveguide,
   wherein, in the planar optical waveguide, an end of an upper clad facing the light source is polished to form a first refractive surface inclined at a first angle to refract a light emitted to an upper portion of a core and guide the light to the core, and
   wherein an end of a lower clad facing the light source is processed to form a trench having a second refractive surface inclined at a second angle to refract light emitted to the lower portion of the core and guide the light to the core.

7. The optical module of claim 6, wherein the end of the lower clad facing the light source is bonded to a side surface of a substrate on which the light source is mounted to allow the light source to maintain a certain distance from the core.

8. A method of manufacturing a planar optical waveguide, the method comprising:
   forming a lower clad layer as a plate type substrate;
   forming a core layer on the lower clad layer;
   forming an upper clad layer on the core layer;
   forming a first refractive surface inclined at a first angle at an end of the upper clad layer facing a light source to refract a light emitted to an upper portion of the core layer and guide the light to the core layer; and
   forming a trench having a second refractive surface inclined at a second angle at an end of the lower clad layer facing the light source to refract light emitted to a lower portion of the core layer and guide the light to the core layer.

9. The method of claim 8, further comprising:
   forming an adhesive surface bonded to a side surface of a substrate on which the light source is mounted at a lower portion of the trench of the end of the lower clad layer facing the light source to allow the light source to maintain a certain distance from the core layer of the planar optical waveguide.

10. The method of claim 9, wherein in the forming of the adhesive surface, the adhesive surface is polished to have a polishing depth set with respect to the core layer.

* * * * *